United States Patent
Lasserre et al.

(10) Patent No.: US 12,439,084 B2
(45) Date of Patent: Oct. 7, 2025

(54) METHOD AND APPARATUS OF ENCODING/DECODING POINT CLOUD CAPTURED BY A SPINNING SENSORS HEAD

(71) Applicant: BEIJING XIAOMI MOBILE SOFTWARE CO., LTD., Beijing (CN)

(72) Inventors: Sebastien Lasserre, Beijing (CN); Jonathan Taquet, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 28 days.

(21) Appl. No.: 18/575,807

(22) PCT Filed: Apr. 20, 2022

(86) PCT No.: PCT/CN2022/088037
§ 371 (c)(1),
(2) Date: Dec. 29, 2023

(87) PCT Pub. No.: WO2023/273537
PCT Pub. Date: Jan. 5, 2023

(65) Prior Publication Data
US 2024/0163480 A1    May 16, 2024

(30) Foreign Application Priority Data
Jul. 2, 2021    (EP) .................... 21305921

(51) Int. Cl.
*H04N 19/597* (2014.01)
*H04N 19/91* (2014.01)

(52) U.S. Cl.
CPC ........... *H04N 19/597* (2014.11); *H04N 19/91* (2014.11)

(58) Field of Classification Search
CPC .......................... H04N 19/597; H04N 19/91
See application file for complete search history.

(56) References Cited

U.S. PATENT DOCUMENTS

| | | | |
|---|---|---|---|
| 2020/0045292 A1* | 2/2020 | Boyce | H04N 13/178 |
| 2020/0175725 A1* | 6/2020 | Mekuria | G06T 15/08 |

(Continued)

FOREIGN PATENT DOCUMENTS

| | | |
|---|---|---|
| WO | 2017126314 A1 | 7/2017 |
| WO | 2020101021 A1 | 5/2020 |
| WO | 2020116563 A1 | 6/2020 |

OTHER PUBLICATIONS

[GPCC-EE13.53] Algorithmic explanation of the new Lidar Codec LL-LC2, (37p).

(Continued)

*Primary Examiner* — Zaihan Jiang
(74) *Attorney, Agent, or Firm* — Arch & Lake LLP

(57) ABSTRACT

There is provided methods and apparatus of encoding/decoding a point cloud captured by a set of sensors. The encoding method obtains a list of ordered points of the point cloud by ordering the points according to a lexicographic order based on azimuthal angles and sensor indices associated with points of the point cloud; obtains a next point following a current point in the list of ordered points and having an order index different of an order index of the current point, and obtains a number of duplicated points equals to a number of points following the current point that have an order index equals to the order index of the current point; encodes the number of duplicated points and encodes an order index difference representing a difference between the order index of the next point and the order index of the current point.

13 Claims, 12 Drawing Sheets

(56) References Cited

U.S. PATENT DOCUMENTS

| | | | |
|---|---|---|---|
| 2020/0302237 | A1 | 9/2020 | Hennings Yeomans et al. |
| 2021/0314616 | A1* | 10/2021 | Ray ............................ G06T 9/00 |
| 2022/0120908 | A1* | 4/2022 | Kato ...................... G01S 7/4814 |
| 2022/0215596 | A1* | 7/2022 | Van der Auwera .... H04N 19/25 |
| 2022/0270288 | A1* | 8/2022 | Qu ........................ G06V 20/588 |
| 2022/0357450 | A1* | 11/2022 | Jang ......................... G01S 7/497 |
| 2023/0186545 | A1* | 6/2023 | Schluessler ............. G06T 15/04 |
| | | | 345/419 |
| 2023/0401754 | A1 | 12/2023 | Champel et al. |
| 2024/0161460 | A1* | 5/2024 | Yang ....................... G06V 20/64 |
| 2024/0348772 | A1* | 10/2024 | Wang .................... H04N 19/139 |
| 2024/0385318 | A1* | 11/2024 | Tommaso .............. G06N 20/00 |

OTHER PUBLICATIONS

CNOA issued in CN Application 202280046412.1 dated Oct. 24, 2024, with English translation, (10p).
"G-PCC codec description", ISO/IEC JTC 1/SC 29/WG 1 Coding of moving pictures and audio Convenorship: JISC ( Japan), ISO/IEC JTC 1/SC 29/WG 11 N19525 (73p).
International Search Report of Application No. PCT/CN2022/088037 dated on Jul. 19, 2022, (3p).
Office Action issued to Indian Application No. 202447007231 dated Jun. 3, 2025, (7p).

* cited by examiner

METHOD AND APPARATUS OF ENCODING/DECODING POINT CLOUD CAPTURED BY A SPINNING SENSORS HEAD

CROSS-REFERENCE TO RELATED APPLICATION

This application is the U.S. national phase application of International Application No.: PCT/CN2022/088037, filed on Apr. 20, 2022, which claims priority to EP application No.: 21305921.5, filed on Jul. 2, 2021, the entire disclosures of which are incorporated herein by reference for all purposes.

BACKGROUND

The present section is intended to introduce the reader to various aspects of art, which may be related to various aspects of at least one exemplary embodiment of the present application that is described and/or claimed below. This discussion is believed to be helpful in providing the reader with background information to facilitate a better understanding of the various aspects of the present application.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a tridimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of a geometry (locations of the points in a 3D space usually represented by 3D cartesian coordinates x, y and z) and attributes.

Point clouds may be captured by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, also known as Moving Picture Experts Group or MPEG, has initiated work items on point cloud compression. This has led to two standards, namely MPEG-I part 5 (ISO/IEC 23090-5) or Video-based Point Cloud Compression (V-PCC)

MPEG-I part 9 (ISO/IEC 23090-9) or Geometry-based Point Cloud Compression (G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-captured sparse geometry data.

The G-PCC coding method has two schemes for the compression of a captured sparse geometry data.

The first scheme is based on an occupancy tree, being locally any type of tree among octree, quadtree or binary tree, representing the point cloud geometry. Occupied nodes are split down until a certain size is reached, and occupied leaf nodes provide the 3D locations of points, typically at the center of these nodes. The occupancy information is carried by occupancy flags signaling the occupancy status of each of the child nodes of nodes. By using neighbor-based prediction techniques, high level of compression of the occupancy flags can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de)coding is performed after complete geometry (de)coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data captured by a spinning sensors (lidar) head mounted on a moving vehicle. This usually requires a simple and low latency embarked encoder. Simplicity is required because the encoder is likely to be deployed on computing units which perform other processing in parallel, such as (semi-)autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to spinning sensors-captured sparse geometry data have been already exploited in G-PCC and have led to very significant gains of compression.

First, G-PCC exploits the elevation angle (relative to the horizontal ground) of capture from a spinning sensors head as depicted on FIGS. 1 and 2. A spinning sensors head 10 comprises a set of sensors 11, here five sensors are represented. The spinning sensors head 10 may spin around a vertical axis z to capture geometry data of a physical object. Sensors-captured geometry data is then represented in spherical coordinates $(r_{3D}, \phi, \theta)$, where $r_{3D}$ is the distance of a point $P_n$ from the spinning sensors head's center, $\phi$ is an azimuthal angle of the spinning sensors head's spin relative to a referential (for example the longitudinal axis of the spinning sensors head), and $\theta$ is an elevation angle of a sensor k of the spinning sensors head relative to a horizontal referential plane (for example a plane perpendicular to the axis z).

A regular distribution along the azimuthal angle has been observed on spinning sensors captured data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i \forall i=0$ to I−1 where I is a number of azimuthal angles used for the capture of the points and $\theta_k \forall k=0$ to K−1 where K is a number of sensors of the spinning sensors head 10. Basically, G-PCC represents spinning sensors-captured sparse geometry data on a 2D discrete angular plane $(\phi, \theta)$ as depicted on FIG. 3, together with a radius value $r_{3D}$ for each point.

This quasi 1D property has been exploited in G-PCC in both the occupancy tree and the predictive tree by predicting, in the spherical coordinates space, the location of a current point based on an already coded point by using the discrete nature of angles.

More precisely, the occupancy tree uses DCM intensively and entropy codes the direct locations of points within a node by using a context-adaptive entropy coder. Contexts are then obtained from the local conversion of the point locations into angular coordinates $(\phi, \theta)$ and from the location of these angular coordinates relative to discrete angular coordinates $(\phi_i, \theta_k)$ obtained from precedingly coded points. The predictive tree directly codes a first version of a point location in the spherical coordinates $(r_{2D}, \phi, \theta)$, where $r_{2D}$ is the projected radius on the horizontal xy plane as depicted on FIG. 4, using the quasi 1D nature $(r_{2D}, \phi_i, \theta_k)$ of this coordinate space. Then, spherical coordinates $(r_{2D}, \phi, \theta)$ are converted into 3D cartesian coordinates (x, y, z) and a xyz residual is coded to tackle the errors of coordinate conversion, the approximation of elevation and azimuthal angles and potential noise.

G-PCC does use the angular priors to better compress spinning sensors-captured sparse geometry data but does not adapt the coding structure to the order of capture. By its very nature, the occupancy tree must be coded down to its last depth before outputting a point. This occupancy is coded in the so-called breadth-first order: the occupancy of the root node is first coded, indicating its occupied child nodes; then the occupancy for each of the occupied child nodes is coded, indicating the occupied grand-child nodes; and so on iteratively over the tree depth until leaf nodes can be determined and the corresponding points are provided/output to an application or to the attribute(s) coding scheme. Regarding the predictive tree, the encoder is free to choose the order of point in the tree, but to obtain good compression performance, to optimize the prediction accuracy, G-PCC proposes to code one tree per sensor, as depicted on FIG. 5. This has mainly the same drawback as using one coding slice per sensor, i.e. non-optimal compression performance because prediction between sensors is not allowed and does not provide encoder low latency. Worse, one should have one coding processing per sensor and the number of core coding units should equal the number of sensing sensors; this is not practical.

In brief, in a framework of a spinning sensors head used for capturing sparse geometry data of a point cloud, prior arts do not solve the problem of combining encoding and decoding simplicity, low latency and compression performance.

SUMMARY

The following section presents a simplified summary of at least one exemplary embodiment in order to provide a basic understanding of some aspects of the present application. This summary is not an extensive overview of an exemplary embodiment. It is not intended to identify key or critical elements of an embodiment. The following summary merely presents some aspects of at least one of the exemplary embodiments in a simplified form as a prelude to the more detailed description provided elsewhere in the document. The present application generally relates to methods and apparatus of encoding/decoding point cloud captured by a spinning sensors head.

According to a first aspect of the present application, there is provided a method of encoding a point cloud captured by a set of sensors into a bitstream of encoded point cloud data.

The method comprises a) obtaining, for a point of the point cloud, a sensor index associated with a sensor that captured the point, an azimuthal angle representing a capture angle of said sensor, each captured point being represented by a point in a 2D discrete angular plane in which said sensor index is a coordinate of a first axis of the 2D discrete angular plane and said azimuthal angle is a coordinate of a second axis of the 2D discrete angular plane; b) obtaining a list of ordered points of the point cloud by ordering the points according to a lexicographic order based first on the azimuthal angles and then on the sensor indices or inversely, an order index being associated with each point of the point cloud according to the rank of said point in the list of ordered points; c) obtaining a next point following a current point in the list of ordered points, and having an order index different of an order index of the current point, and obtaining a number of duplicated points, which equals to a number of points following the current point that have an order index equals to the order index of the current point; d) encoding, in the bitstream, the number of duplicated points; e) obtaining and encoding, in the bitstream, an order index difference representing a difference between the order index of the next point and the order index of the current point; f) updating the current point by considering the next point as being a new current point; and the steps c), d), e) and f) are iterated until all the points of the list of ordered points have been considered.

In one exemplary embodiment, encoding the number of duplicated points comprises: binarizing the number of duplicated points into a series of binary data whose number is lower than or equal to a maximum bound; and entropy coding each binary data of the series of binary data.

According to a second aspect of the present application, there is provided a method of decoding a point cloud captured by a set of sensors from a bitstream of encoded point cloud data. The method comprises a) decoding, from the bitstream, an information representative of a number of duplicated points associated with an already decoded current point of the point cloud; b) reconstructing a number of duplicated points, which equals to the decoded number of duplicated points, each duplicated point having a same azimuthal angle equaling to an azimuthal angle of said already decoded current point, and a sensor index equaling to a sensor index of said already decoded current point; c) decoding an order index difference from the bitstream for a next point, said next point having an order index different of an order index of the already decoded current point, an order index being associated with a point of the point cloud according to a rank of said point in a list of ordered points obtained by ordering the points of the point cloud according to a lexicographic order based first on azimuthal angles and then on sensor indices associated with the points of the point cloud, or inversely; d) obtaining an order index for the next point from the decoded order index difference and the order index of the already decoded current point; e) obtaining a sensor index associated with a sensor that captured the next point and an azimuthal angle representing a capture angle of said sensor from the order index of the next point; the already decoded current is updated by considering the next point as being a new already decoded current point and iterating steps a) to e), until all the information representative of a number associated with an already decoded current point of the point cloud are decoded.

According to a third aspect of the present application, there is provided an apparatus of encoding a point cloud captured by a set of sensors into a bitstream of encoded point cloud data. The apparatus comprises one or more processors configured to carry out a method according to the first aspect of the present application.

According to a fourth aspect of the present application, there is provided an apparatus of decoding a point cloud captured by a set of sensors from a bitstream of encoded point cloud data. The apparatus comprises one or more processors configured to carry out a method according to the second aspect of the present application.

According to a fifth aspect of the present application, there is provided a bitstream of encoded point cloud data captured by a set of sensors, wherein the bitstream comprises at least one syntax element carrying at least one information representative of a number of duplicated points associated with a decoded current point of the point cloud.

According to a sixth aspect of the present application, there is provided a computer program product including instructions which, when the program is executed by one or more processors, causes the one or more processors to carry out a method according to the first aspect of the present application.

According to a seventh aspect of the present application, there is provided a non-transitory storage medium carrying instructions of program code for executing a method according to the first aspect of the present application.

According to an eighth aspect of the present application, there is provided a computer program product including instructions which, when the program is executed by one or more processors, causes the one or more processors to carry out a method according to the second aspect of the present application.

According to a ninth aspect of the present application, there is provided a non-transitory storage medium carrying instructions of program code for executing a method according to the second aspect of the present application.

The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, there is no intent to limit exemplary embodiments to the particular forms disclosed. On the contrary, the disclosure is intended to cover all modifications, and alternatives falling within the spirit and scope of the present application.

When a figure is presented as a flow diagram, it also provides a block diagram of a corresponding apparatus. Similarly, when a figure is presented as a block diagram, it also provides a flow diagram of a corresponding method/process.

At least one of the aspects generally relates to point cloud encoding and decoding, and at least one other aspect generally relates to transmitting a bitstream generated or encoded.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the present application may be used individually or in combination.

Figure 6:
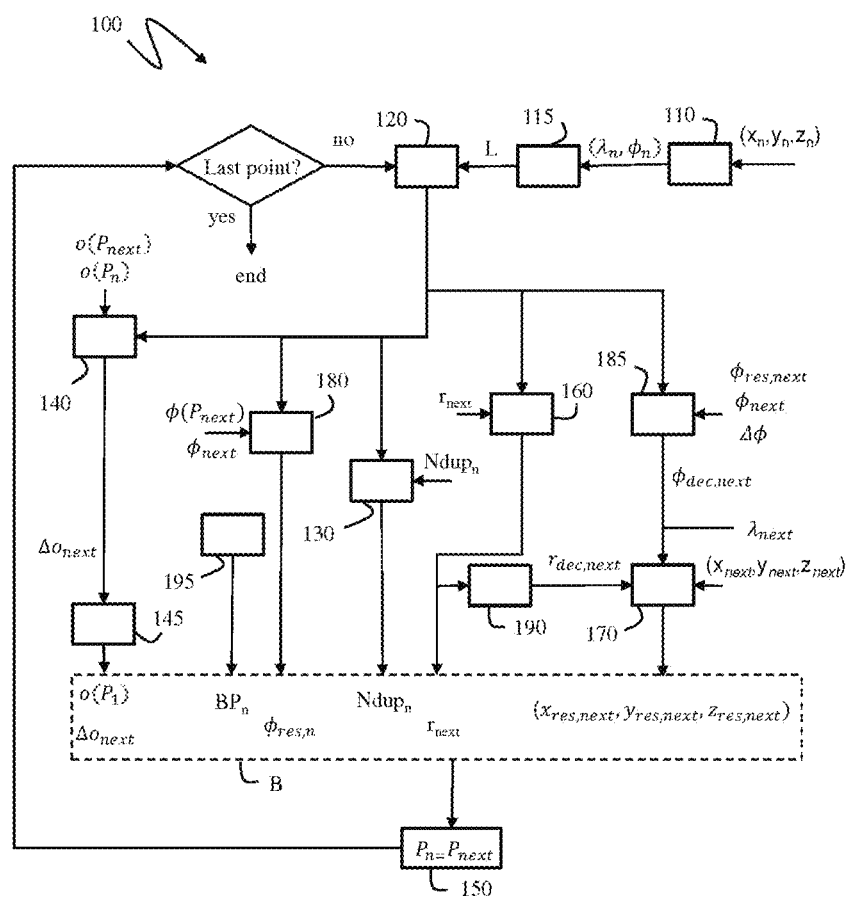
FIG. 6 illustrates a block diagram of steps of a method 100 of encoding a point cloud into a bitstream of encoded point cloud data in accordance with at least one exemplary embodiment of the present disclosure.

FIG. 6 illustrates a block diagram of steps of a method 100 of encoding a point cloud into a bitstream of encoded point cloud data in accordance with at least one exemplary embodiment.

Geometry data of the point cloud, i.e. the 3D locations of points of the point cloud, is captured by a spinning sensor head.

The spinning sensors head may be the spinning sensors head 10 comprising multiple sensors as explained above. The scope of the disclosure is not limited to a specific sensors and may apply to any spinning sensors head able to spin around an axis and to capture 3D locations points for each capture angular angles. Sensors may be cameras, depth sensors, lasers, Lidars or scanners.

Figure 4:
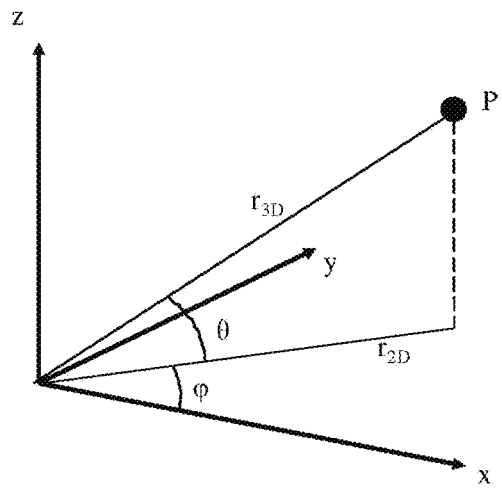
FIG. 4 illustrates a representation of a point in a 3D space in accordance with prior art.
Figure 5:
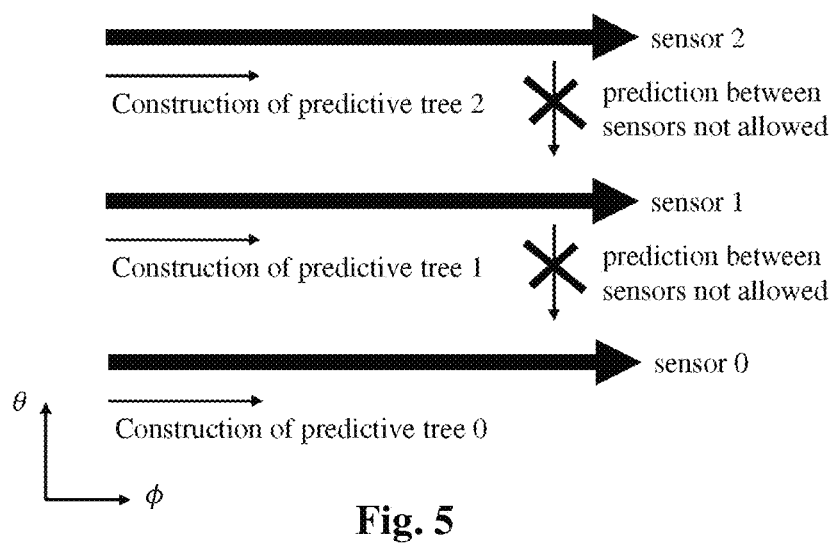
FIG. 5 illustrates the encoding of a predictive tree in accordance with prior art.

The captured 3D locations are represented in an angular coordinate ($\phi$, $\lambda$) system, as depicted on FIG. 4, together with radius values $r_{2D}$ or $r_{3D}$. The coordinate $\phi$ is the azimuthal angle of the sensor head's spin whose discrete values are denoted $\phi_i(\forall i=0$ to $I-1)$. The coordinate $\lambda$ is a sensor index whose discrete values are denoted $\lambda_k(\forall k=0$ to $K-1)$. The radius $r_{2D}$ or $r_{3D}$ belongs to a continuous range of values.

Figure 1:
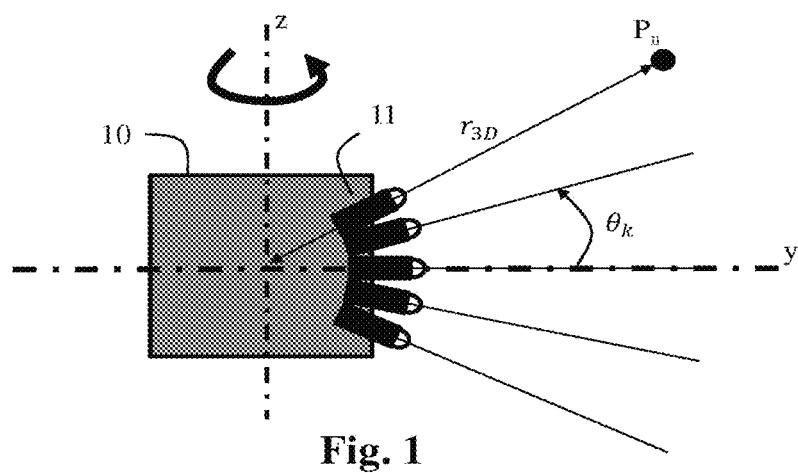
FIG. 1 illustrates a side view of a sensors head and some of its parameters in accordance with prior art.
Figure 2:
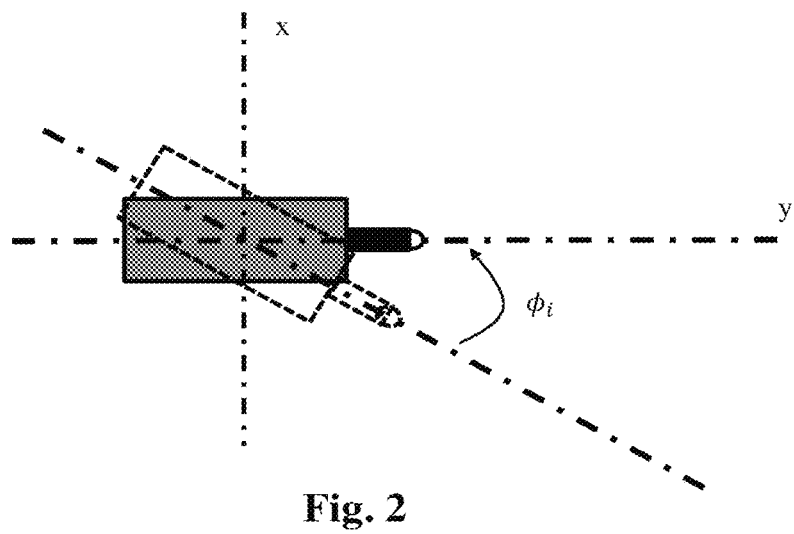
FIG. 2 illustrates a top view of the sensors head and some of its parameters in accordance with prior art.
Figure 7:
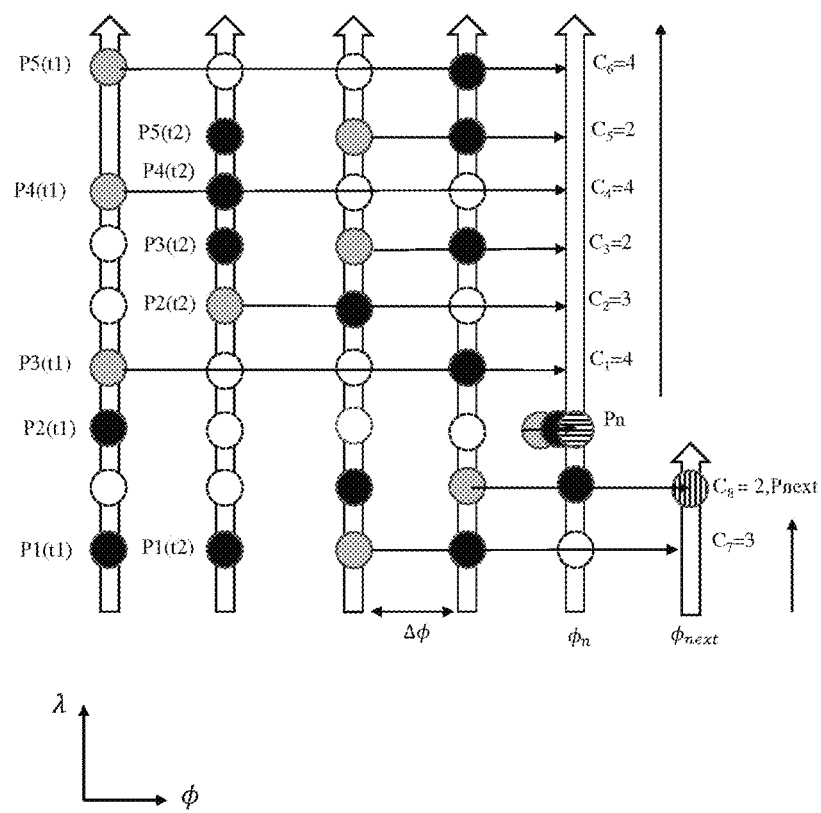
FIG. 7 illustrates an example of ordered captured point represented in a 2D space in accordance with one exemplary embodiment of the present disclosure.

Due to the regular spin (rotation) of the spinning sensors head 10 and the continuous capture with fixed time interval, the azimuthal distance between two points probed by a same sensor is a multiple of an elementary azimuthal shift $\Delta\phi$ as depicted on FIG. 7. Then, for example, at a first captured time t1, five points $P_1(t1), \ldots, P_k(t1), \ldots P_5(t1)$ are probed by the five sensors of the spinning sensors head 10 of FIG. 1 with an azimuthal angle $\phi_1$, at a second capture time t2, five points $P_1(t2), \ldots, P_k(t2), \ldots P_5(t2)$ are probed by the sensors of the spinning sensors head 10 with an azimuth angle $\phi_2=\phi_1+\Delta\phi$, and so on. Consequently, the discrete value $\phi_1$ may be seen as the quantized value of the azimuthal angles $\phi$ of the points $P_1(t1), \ldots, P_k(t1), \ldots P_5(t1)$; quantization being obtained by a quantization step $\Delta\phi$. Similarly, the discrete value $\phi_2$ may be seen as the quantized value of the azimuthal angles $\phi$ of the points $P_1(t2), \ldots, P_k(t2), \ldots P_5(t2)$.

In step 110, for each point $P_n$ of the point cloud, a sensor index $\lambda_{k(n)}$ (among the set of sensor indices $\lambda_k(\forall k=0$ to $K-1)$) associated with a sensor that captured the point $P_n$, an azimuthal angle $\phi_{i(n)}$ (among the set of discrete angles $\phi_i(\forall i=0$ to $I-1)$) representing a capture angle of said sensor and a radius value $r_n$ of spherical coordinates of the point $P_n$ are obtained. For sake of simplicity, $\lambda_{k(n)}$ and the index i(n) will be respectively denoted $\lambda_n$ and $\phi_n$ hereafter. Consequently, $\phi_n$ is not an angle but an index i($\forall i=0$ to $I-1$)) pointing to an angle $\phi_i$. Nevertheless, because there is an unambiguous relation between the index $\phi_n$ and the canonically associated azimuthal angle $\phi_{i(n)}=\phi_{\phi_n}$, the quantity $\phi_n$ is still referred as an azimuthal angle.

Figure 3:
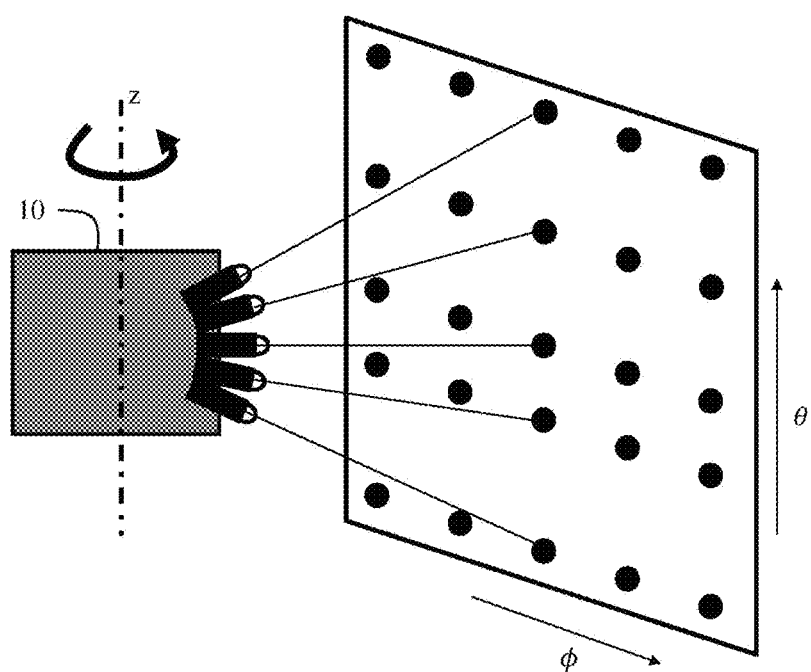
FIG. 3 illustrates a regular distribution of data captured by a spinning sensors head in accordance with prior art.

Each captured point $P_n$ may be represented by a point in the 2D discrete angular plane illustrated as depicted on FIG. 3, in which the sensor index $\lambda_n$ is a coordinate of a first axis of the 2D discrete angular plane and the azimuthal angle $\phi_n$ is a coordinate of a second axis of the 2D discrete angular plane.

In one exemplary embodiment of step 110, the sensor index $\lambda_n$ and the azimuthal angle $\phi_n$ are obtained by converting 3D cartesian coordinates $(x_n, y_n, z_n)$ representing the 3D location of a captured point $P_n$. These 3D cartesian coordinates $(x_n, y_n, z_n)$ may be output of the spinning sensors head 10.

In step 115, a list L of ordered points is obtained by ordering (sorting) the points of the point cloud according to a lexicographic order based first on the azimuthal angles $\phi_n$ and then on the sensor indices $\lambda_n$ or inversely. An order index is associated with each point $P_n$ according to the rank of said point in the list L of ordered points.

In one exemplary embodiment of step 115, the points are ordered (sorted) according to a lexicographic order based first on the azimuthal angle and then on the sensor index. Referring back to FIG. 7, the ordered captured points are $P_1(t1), \ldots, P_k(t1), \ldots P_5(t1), P_1(t2), \ldots, P_k(t2), \ldots P_5(t2), \ldots$.

The order index $o(P_n)$ of a point $P_n$, i.e. the rank of the point $P_n$ in the list L of the ordered points, is obtained by:

$$o(P_n) = \phi_n * K + \lambda_n$$

Figure 8:
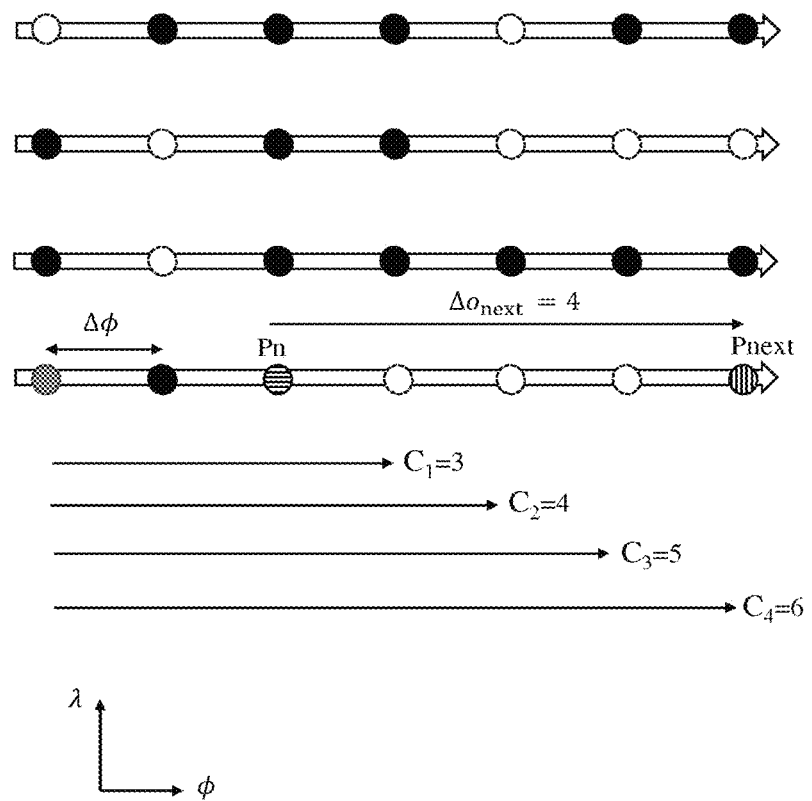
FIG. 8 illustrates another example of ordered captured point represented in a 2D space in accordance with one exemplary embodiment of the present disclosure.

In one exemplary embodiment of step 115, illustrated on FIG. 8, the points are ordered according to a lexicographic order based first on the sensor index and then on the azimuthal angle.

The order index $o(P_n)$ of a point $P_n$ is obtained by:

$$o(P_n) = \lambda_n * I + \phi_n$$

In step 120, a point $P_{next}$ is obtained for a current point $P_n$ of the list L of ordered points. The point $P_{next}$ is a point in the list L of ordered points following the current point $P_n$ and having an order index $o(P_{next})$ different of the order index $o(P_n)$ of a current point $P_n$. A number $Ndup_n$, associated with the current point $P_n$, is also obtained. The number $Ndup_n$ equals the number of points following the current point $P_n$ that have an order index equals to the order index $o(P_n)$ of the current point $P_n$.

Two points have different order indices when they have different sensor indices k(n) and/or different azimuthal angles i(n).

If two ordered points in the list L of ordered points have a same order index, i.e. a same sensor index and a same azimuthal angle, these points are denoted duplicated points. If two ordered points in the list L of ordered points have different sensor indices and/or different azimuthal angles they are denoted non-duplicated points.

The number $Ndup_n$ equals a number of duplicated points following the current point $P_n$.

In one exemplary embodiment of step 120, starting from the current point $P_n$, a first next point $P_{n+1}$ of the point $P_n$ in the list of ordered points is considered. If the point $P_{n+1}$ has an order index equals to the order index $o(P_n)$, a two next point $P_{n+2}$ of the current point $P_n$ in the list of ordered points is considered. If said two next point $P_{n+2}$ has an order index equals to the order index $o(P_n)$, a third next point $P_{n+3}$ of the current point $P_n$ in the list L of ordered points is considered, and so on until a next point has an order index different of the order index $o(P_n)$. The number $Ndup_n$ of duplicated points, associated with the current point $P_n$, is incremented each time a next point of the list L of ordered points has an order index equals to the order index $o(P_n)$ of the current point.

In step 130, an information representative of the number $Ndup_n$, associated with the current point $P_n$, is encoded in the bitstream B.

In step 140, an order index difference $\Delta o_{next}$ is obtained. The order index difference $\Delta o_{next}$ represents a difference between the order index $o(P_{next})$ and the order index $o(P_n)$ of the current point $P_n$:

$$\Delta o_{next} = o(P_{next}) - o(P_n)$$

By definition of $P_{next}$ being the first point after $P_n$ having an order different than $o(P_n)$, the value $\Delta o_{next}$ is not equal to zero.

In step 145, the order index difference $\Delta o_{next}$ is encoded in the bitstream B.

The order index $o(P_1)$ of the first point $P_1$ in the list L of ordered points may be directly coded into the bitstream B. This is equivalent to arbitrary setting the order index of a virtual zero-th point to zero, i.e. $o(P_0)=0$, and coding $\Delta o_1 = o(P_1) - o(P_0) = o(P_1)$.

Given the order index $o(P_1)$ of the first point and an order difference $\Delta o_{next}$, the order index $o(P_{next})$ of a point $P_{next}$ may then be reconstructed by:

$$o(P_{next}) = o(P_n) + \Delta o_{next}$$

Then, sensor indices $\lambda_{next}$ and azimuthal angle $\phi_{next}$ are obtained by:

$$\lambda_{next} = o(P_{next}) \bmod K \qquad (1)$$

$$\phi_{next} = o(P_{next})/K \qquad (2)$$

where the division/K is the integer division (aka Euclidian division). Therefore, $o(P_1)$ and $\Delta o_{next}$ are an alternative representation of $\lambda_{next}$ and $\phi_{next}$.

In one exemplary embodiment of step 145, the order index difference $\Delta o_{next}$ is entropy-encoded as explained later in reference to FIG. 13.

In step 150, the current point $P_n$ is updated by considering the point $P_{next}$ as being the new current point $P_n$.

The steps 120, 130, 140, 145 and 150 iterates until all the points of the list L of ordered points have been considered.

Ordering the captured points provides interaction between points captured by different sensors of the spinning sensors head. A single encoding is thus required for encoding those ordered points leading to a very simple and low latency encoding.

Reconstructing points from the order index differences $\Delta o_{next}$ requires information such as an order index $o(P_1)$ of a first point in the angular coordinates ($\phi$, $\lambda$) system, and sensor setup parameters such as the elementary azimuthal shift $\Delta\phi$ or an elevation angle $\theta_k$ associated with each sensor. This information may also be encoded in the bitstream B or signaled by another mean or may be known beforehand by a decoder.

In one exemplary embodiment, the method further comprises in step 160, encoding, in the bitstream B, the radius values $r_{next}$ of spherical coordinates associated with the point $P_{next}$.

In one exemplary embodiment of step 160, the radius value $r_{next}$ is quantized.

In one exemplary embodiment of step 160, the radius value $r_{next}$ is entropy coded.

In one exemplary embodiment of step 160, the radius value $r_{next}$ is quantized and entropy coded.

In one exemplary embodiment of step 160, the radius value $r_{next}$ represents the radius $r_{3D}$.

In one exemplary embodiment of step 160, the radius value $r_{next}$ represents the projected radius $r_{2D}$ on the horizontal xy plane as depicted on FIG. 4.

In one exemplary embodiment, the method further comprises, in step 170, encoding a residual ($x_{res,next}$, $y_{res,next}$, $z_{res,next}$) of three-dimensional cartesian coordinates of the point $P_{next}$ based on their three-dimensional cartesian coordinates ($x_{next}$, $y_{next}$, $z_{next}$), on a decoded azimuthal angle $\phi_{dec,next}$, on a decoded radius value $r_{dec,next}$ obtained from the radius value $r_{next}$, and on a sensor index $\lambda_{next}$.

In one exemplary embodiment of step 170, the residual ($x_{res,next}$, $y_{res,next}$, $z_{res,next}$) is a difference between the three-dimensional cartesian coordinates ($x_{next}$, $y_{next}$, $x_{next}$) of the point $P_{next}$ and estimated three-dimensional coordinates ($x_{estim,next}$, $y_{estim,next}$, $z_{estim,next}$).

In one exemplary embodiment of step 170, the residual ($x_{res,next}$, $y_{res,next}$, $z_{res,next}$) is given by:

$$\begin{cases} x_{res,next} = x_{next} - x_{estim,next} \\ y_{res,next} = y_{next} - y_{estim,next} \\ z_{res,next} = z_{next} - z_{estim,next} \end{cases}$$

In one exemplary embodiment of step 170, the estimated coordinates ($x_{estim,next}$, $y_{estim,next}$) associated with the point $P_{next}$ are based on decoded the azimuthal angle $\phi_{dec,next}$ and the decoded radius value $r_{dec,next}$ associated with the point $P_{next}$.

In one exemplary embodiment of step 170, the residual ($x_{res,next}$, $y_{res,next}$, $z_{res,next}$) is entropy coded.

In one exemplary embodiment of step 170, the estimated coordinates ($x_{estim,next}$, $y_{estim,next}$) are given by:

$$\begin{cases} x_{estim,next} = r_{dec,next} * \cos(\phi_{dec,next}) \\ y_{estim,next} = r_{dec,next} * \sin(\phi_{dec,next}) \end{cases}$$

In one exemplary embodiment of step 170, the estimated coordinate ($z_{estim,next}$) associated with the point $P_{next}$ is based on a decoded radius value $r_{dec,next}$ associated with the point $P_{next}$ and an elevation angle $\theta_{next}$ of a sensor that captured the point $P_{next}$.

In one exemplary embodiment of step 170, the estimated coordinate ($z_{estim,next}$) is also based on the sensor indices $\lambda_n$.

In one exemplary embodiment of step 170, the estimated coordinate ($z_{estim,next}$) is given by:

$$z_{estim,next} = r_{dec,next} \tan \theta_{next}$$

In one exemplary embodiment, the method further comprises, in step 180, encoding, in the bitstream B, residual azimuthal angles $\phi_{res,next}$ associated with the point $P_{next}$.

In an exemplary embodiment of a step 180, the azimuthal angle $\phi_{next}$ is quantized by:

$$\phi_{next} = \text{round}(\phi(P_{next})/\Delta\phi)$$

where $\phi(P_{next})$ is the original azimuthal angle of the point $P_{next}$. In this case, the set of discrete angles $\phi_i (0 \leq i < I)$ is essentially defined by $\phi_i = i*\Delta\phi$ and one obtains $\phi_{i(next)} = \phi_{next} * \Delta\phi$.

The order index $o(P_{next})$ of the point $P_{next}$ is thus given by:

$$o(P_{next}) = \phi_{next} * K + \lambda_{nest} = \text{round}(\phi(P_{nest})/\Delta\phi) * K + \lambda_{next}$$

The residual azimuthal angle $\phi_{res,next}$ is given by:

$$\phi_{res,next} = \phi(P_{next}) - \phi_{next} * \Delta\phi \quad (3)$$

Figure 9:
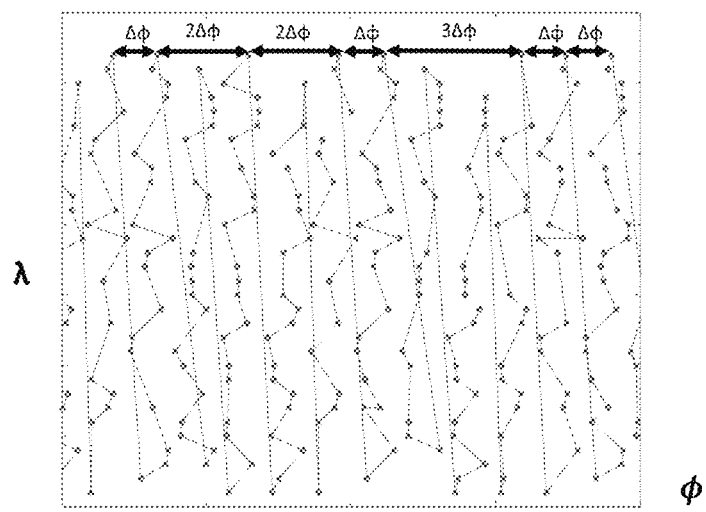
FIG. 9 illustrates an example of captured points in accordance with one exemplary embodiment of the present disclosure.
Figure 10:
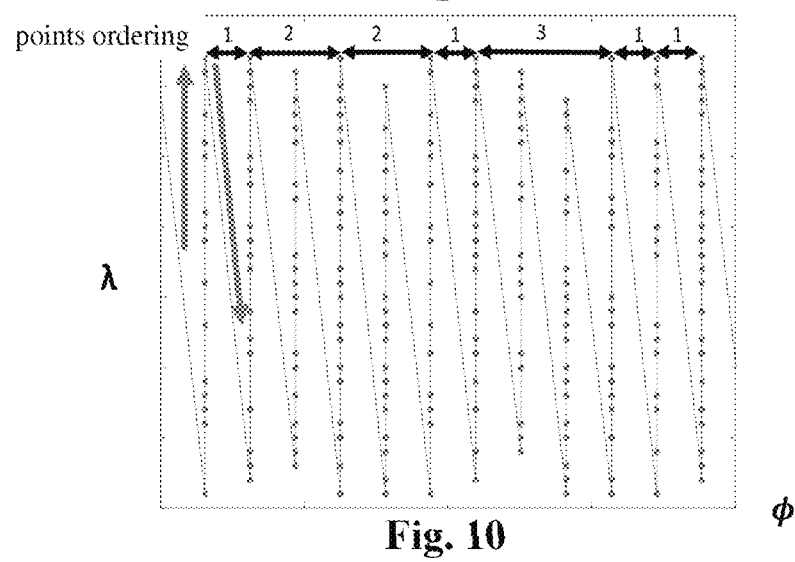
FIG. 10 illustrates an example of ordered and quantized captured points in accordance with one exemplary embodiment of the present disclosure.

This exemplary embodiment of step 180 provides advantages because sometimes, in practice, not all points are captured at each capture time because a noise may be captured or because sensors may not be all perfectly aligned or because, for example, at least one laser beam of a spinning sensors head may not be reflected. Captured points may then look as depicted on FIG. 9. Quantizing the azimuthal angles $\phi(P_{next})$ leads to an easier discrete representation of points in the angular coordinates ($\phi$, $\lambda$) system as depicted on FIG. 10 that allows an easier path for ordering the points of the point cloud.

The residual azimuthal angle $\phi_{res,next}$ is encoded in the bitstream B, preferably by quantizing and/or entropy-coding.

This exemplary embodiment of step 180 also reduces the dynamic of the angular angles to be encoded into the bitstream because only a residual is encoded rather than the full range value. High compression performance is reached.

In one exemplary embodiment, the method further comprises, in step 185, obtaining the decoded azimuthal angle $\phi_{dec,next}$ based on the azimuthal angle $\phi_{next}$.

In one exemplary embodiment of step 185, the decoded azimuthal angle $\phi_{dec,next}$ is given by:

$$\phi_{dec,next} = \phi_{next} * \Delta\phi$$

In one exemplary embodiment of step 185, the decoded azimuthal angle $\phi_{dec,next}$ is obtained based on azimuthal angle $\phi_{next}$, the elementary azimuthal shift $\Delta\phi$ and the residual azimuthal angle $\phi_{res,next}$.

In one exemplary embodiment of step 185, the decoded azimuthal angle $\phi_{dec,next}$ is given by:

$$\phi_{dec,next} = \phi_{next} * \Delta\phi + \phi_{res,next}$$

In one exemplary embodiment of step 185, the decoded azimuthal angle $\phi_{dec,next}$ is obtained based on the azimuthal angle $\phi_{next}$, the elementary azimuthal shift $\Delta\phi$ and a decoded angular residual $\phi_{dec,res,next}$ obtained by de-quantizing the quantized residual azimuthal angle $\phi_{res,next}$ given by equation 3.

In one exemplary embodiment of step 185, the decoded azimuthal angle $\phi_{dec,next}$ is given by:

$$\phi_{dec,next} = \phi_{next} * \Delta\phi + \phi_{dec,res,next}$$

In one exemplary embodiment, the method further comprises, in step 190, obtaining the decoded radius value $r_{dec,next}$ based on the encoded radius value $r_{next}$.

In one exemplary embodiment of step 190, the decoded radius value $r_{dec,next}$ is obtained by de-quantizing a quantized radius values $r_{next}$.

Encoding Ndupn in the bitstream is advantageous, compared to encoding a series of values order index differences $\Delta o_{next}$ equal to zero, by offering a less complex process in case of the presence of many duplicated points and also by offering improved compression performance.

The number Ndupn of duplicated points is encoded in the bitstream B to indicates if a current point $P_n$ is duplicated, i.e. have a same azimuthal angle and a same sensor index. But two duplicated points may not have same three-dimensional cartesian coordinates because they may have different radius.

In one exemplary embodiment, the method further comprises, in step 195, encoding in the bitstream B, a binary information $BP_n$ indicating whether duplicated points of a current point $P_n$ have or not same three-dimensional cartesian coordinates.

This embodiment is advantageous because if the binary information $BP_n$ indicates (e.g. $BP_n=1$) that duplicated points of the current $BP_n$ have same three-dimensional cartesian coordinates, steps 140 to 190 are bypassed reducing the cost for encoding the duplicated points of the points cloud having same three-dimensional cartesian coordinates.

In one exemplary embodiment of step 195, the binary information $BP_n$ is entropy-encoded.

In a variant, the binary data BP is entropy coded by a Context-Adaptive Binary Arithmetic Coder (like CABAC), and the contexts are selected according to the sensor index of the current point $P_n$.

Figure 11:
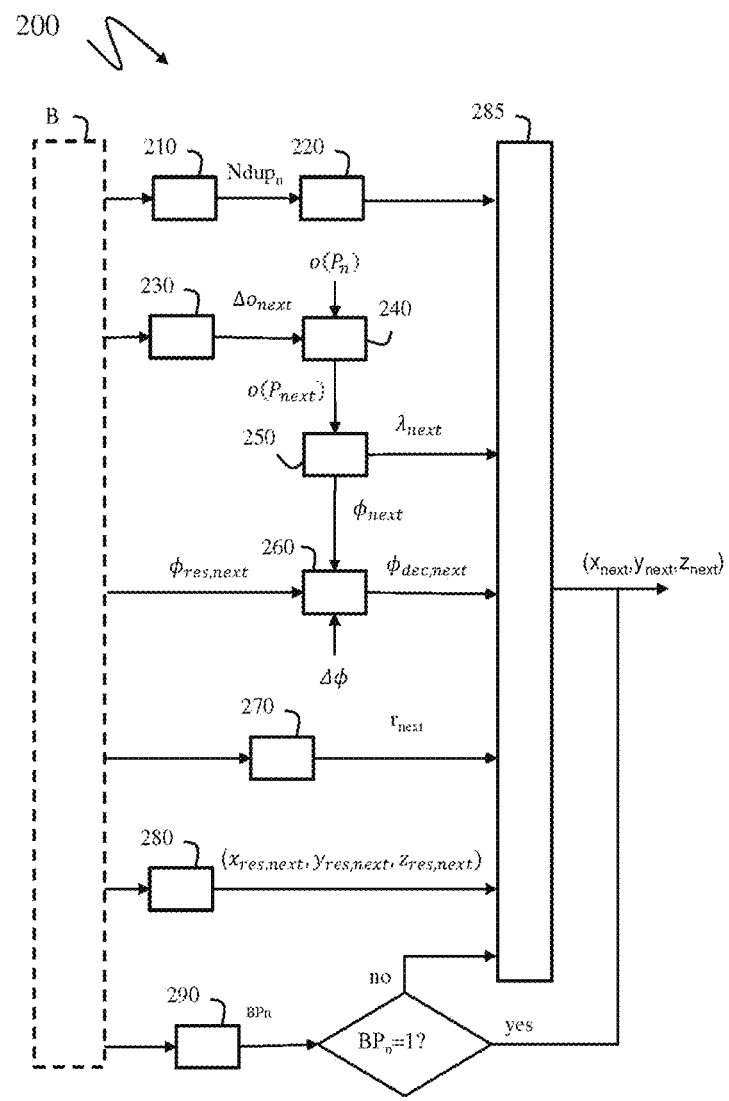
FIG. 11 illustrates a block diagram of steps of a method 200 of decoding a point cloud from a bitstream of encoded point cloud data in accordance with at least one exemplary embodiment of the present disclosure.

FIG. 11 illustrates a block diagram of steps of a method 200 of decoding a point cloud from a bitstream of encoded point cloud data in accordance with at least one exemplary embodiment.

Decoding points of a point cloud from a bitstream B requires information such a number M of encoded order index differences, an order index $o(P_1)$ of a first point in the angular coordinates $(\phi, \lambda)$ system, and sensor setup parameters such as the elementary azimuthal shift $\Delta\phi$ or an elevation angle $\theta_k$ associated with each sensor k. This information may also be decoded from the bitstream B or received by any other means or may be known beforehand by a decoder.

N points of the point cloud are decoded recursively.

The number M of encoded order index differences is lower than or equal to the number minus one N−1 of the points of the point cloud: M=N−1 when the list L of ordered points does not contain duplicated points, i.e. Ndupn=0 for any n($\forall$n=1 to N). M<N−1 when the list L of ordered points contains at least one duplicated point, i.e. Ndupn≠0 for at least one n.

In step 210, an information representative of a number $Ndup_n$, associated with an already decoded current point $P_n$, is decoded from the bitstream B.

In step 220, $Ndup_n$ duplicated points are obtained, each duplicated point has the same azimuthal angle equals to the azimuthal angle $\phi_n$ of the already decoded current point $P_n$ and a same sensor index equals to the azimuthal sensor index $\lambda_n$ of the already decoded current point $P_n$.

In step 230, an order index difference $\Delta o_{next}$ is decoded from the bitstream B for a point $P_{next}$. The point $P_{next}$ has an order index $o(P_{next})$ in the list L of ordered points different of the order index $o(P_n)$ of the already decoded current point $P_n$.

In step 240, an order index $o(P_{next})$ is obtained for the point $P_{next}$ by:

$$o(P_{next}) = o(P_n) + \Delta o_{next}$$

The order index difference $\Delta o_{next}$ represents a difference between the order index $o(P_{next})$ of the point $P_{next}$ and the order index $o(P_n)$ of the already decoded current point $P_n$.

In step 250, a sensor index $\lambda_{next}$ associated with a sensor that captured the point $P_{next}$ and an azimuthal angle $\phi_{next}$ representing a capture angle of said sensor are obtained from the order index $o(P_{next})$.

In one exemplary embodiment of step 250, the sensor index $\lambda_{next}$ and the azimuthal angles $\phi_{next}$ are obtained by equations (1) and (2).

The already decoded current ($P_n$) is then updated by considering the next point $P_{next}$ as being a new already decoded current point $P_n$, and the steps 210, 220, 230, 240 and 250 are iterated until all the information representative of a number $Ndup_n$ associated with an already decoded current point are decoded.

In one exemplary embodiment, the method further comprises, in step 260, obtaining a decoded azimuthal angle $\phi_{dec,n}$ based on the azimuthal angle $\phi_{next}$.

In one exemplary embodiment of step 260, the decoded azimuthal angle $\phi_{dec,next}$ is obtained based on the azimuthal angle $\phi_{next}$ and the elementary azimuthal shift $\Delta\phi$.

In one exemplary embodiment of step 260, the decoded azimuthal angle $\phi_{dec,next}$ is given by:

$$\phi_{dec,next} = \phi_{next} * \Delta\phi$$

In one exemplary embodiment of step 260, the decoded azimuthal angle $\phi_{dec,next}$ is obtained based on a residual azimuthal angle $\phi_{res,next}$ decoded from the bitstream B.

In one exemplary embodiment of step 260, the decoded azimuthal angle $\phi_{dec,next}$ is given by:

$$\phi_{dec,next} = \phi_{next} * \Delta\phi + \phi_{res,next}$$

In one exemplary embodiment, the method further comprises, in step 270, decoding a radius value $r_{next}$ of spherical coordinates of the point $P_{next}$ from the bitstream B.

In one exemplary embodiment of step 270, the radius value $r_{next}$ is de-quantized to obtain decoded radius values $r_{dec,next}$.

In one exemplary embodiment of step 270, the radius value $r_{next}$ is entropy-decoded and de-quantized to obtain decoded radius values $r_{dec,next}$.

In one exemplary embodiment, the method further comprises, in step 280, decoding a residual ($x_{res,next}$, $y_{res,next}$, $z_{res,next}$) of three-dimensional cartesian coordinates of the point $P_{next}$ from a bitstream B In one exemplary embodiment of step 280, the residual ($x_{res,next}$, $y_{res,next}$, $z_{res,next}$) is entropy-decoded.

In one exemplary embodiment, the method further comprises, in step 285, the three-dimensional cartesian coordinates ($x_{next}$, $y_{next}$, $z_{next}$) of the point $P_{next}$ are decoded based on the decoded residual ($x_{res,next}$, $y_{res,next}$, $z_{res,next}$) of the three-dimensional cartesian coordinates of the point $P_{next}$, the radius value $r_{next}$, the decoded azimuthal angle $\phi_{dec,next}$ and the sensor index $\lambda_{next}$.

In one exemplary embodiment of step 285, the three-dimensional cartesian coordinates ($x_{next}$, $y_{next}$, $z_{next}$) of the point $P_{next}$ are the sums of the residuals ($x_{res,next}$, $y_{res,next}$, $z_{res,next}$) and estimated three-dimensional coordinates ($x_{estim}$, $y_{estim}$, $z_{estim}$):

$$\begin{cases} x_{next} = x_{res,next} + x_{estim} \\ y_{next} = y_{res,next} + y_{estim} \\ z_{next} = z_{res,next} + z_{estim} \end{cases}$$

In one exemplary embodiment of step 285, the estimated coordinates ($x_{estim}$, $y_{estim}$) associated with the point $P_{next}$ are based on the azimuthal angle $\phi_{next}$ and the radius value $r_{next}$.

In one exemplary embodiment of step 285, the estimated coordinates ($x_{estim}$, $y_{estim}$) are given by:

$$\begin{cases} x_{estim} = r_{next} * \cos(\phi_{\phi next}) \\ y_{estim} = r_{next} * \sin(\phi_{\phi next}) \end{cases}$$

In one exemplary embodiment of step 285, the estimated coordinates ($x_{estim,next}$, $y_{estim,next}$) are given by:

$$\begin{cases} x_{estim,next} = r_{dec,next} * \cos(\phi_{dec,next}) \\ y_{estim,next} = r_{dec,next} * \sin(\phi_{dec,next}) \end{cases}$$

where $r_{dec,next}$ is a decoded radius value obtained from the radius values $r_{next}$. For example, the decoded radius values $r_{dec,next}$ may be obtained by de-quantizing the radius values $r_{next}$.

In one exemplary embodiment of step 285, the estimated coordinate ($z_{estim}$) associated with the point $P_{next}$ is based on the radius value $r_{next}$ associated with point $P_{next}$ and an elevation angle $\theta_k$ of a sensor k that captured the point $P_{next}$.

In one exemplary embodiment of step 285, the estimated coordinate ($z_{estim}$) is given by:

$$z_{estim} = r_{next} \tan \theta_k$$

In one exemplary embodiment of step 285, the estimated coordinate ($z_{estim}$) is also based on the sensor index $\lambda_{next}$.

In one exemplary embodiment of step 285, the estimated coordinate ($z_{estim}$) is given by:

$$z_{estim} = r_{next} \tan \theta_{\lambda, next}$$

In one exemplary embodiment, the method further comprises, in step 290, decoding, from the bitstream B, a binary information $BP_n$ indicating whether duplicated points of an already decoded current point $P_n$ have or not same three-dimensional cartesian coordinates.

This embodiment is advantageous because if a binary information $BP_n$ indicates (e.g. $BP_n=1$) that duplicated points of the already decoded current point $P_n$ have same three-dimensional cartesian coordinates, steps 230 to 285 are bypassed and Ndupn new points of the point cloud are created with the three-dimensional cartesian coordinates of the current point $P_n$.

In one exemplary embodiment of step 290, the binary information $BP_n$ is entropy-decoded.

In a variant, the binary data $BP_n$ is entropy decoded by a Context-Adaptive Binary Arithmetic Coder (like CABAC), and the contexts are selected according to the sensor index of the current point $P_n$.

Figure 12:
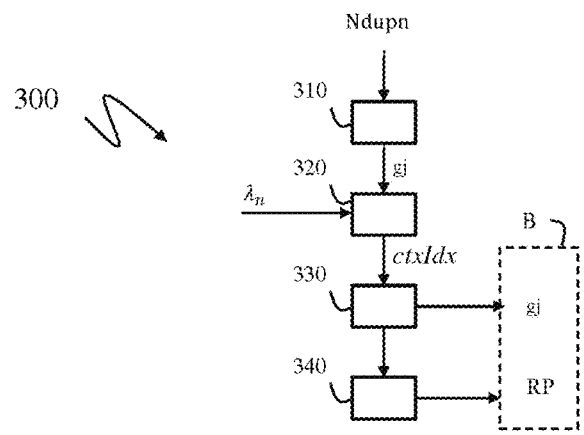
FIG. 12 illustrates a block diagram of steps of a method 300 of entropy-coding a number of duplicated points in accordance with at least one exemplary embodiment of the present disclosure.

FIG. 12 illustrates a block diagram of steps of a method 300 of entropy-coding a number $Ndup_n$ of duplicated points in accordance with at least one exemplary embodiment of step 140.

In step 310, the number $Ndup_n$ of duplicated points is binarized into a series of binary data gj. The number of binary data gj of the series does not exceed a maximum bound $NP_{flag}$.

The maximum bound $NP_{flag}$ is set to bound the number of arithmetically coded binary information per point and then bound the latency to obtain a next point $P_{next}$.

For each binary data $g_j$, in step 320, a context is selected based on the index j and the sensor index $\lambda_n$ associated with the current point $P_n$, and each binary data $g_j$ is context-adaptive entropy coded (step 330) in the bitstream B, based on the selected context.

Context-adaptive entropy encoding the number $Ndup_n$ provides efficient compression performance compared to other encoding technics such as a predictive tree encoding technique because such prediction-based encoding technics do not catch the intrinsic structure of the representation ($\phi$, $\lambda$) of point locations. Such structure is captured by the exemplary embodiments of the present application by selecting contexts and entropy encoding the number $Ndup_n$ based on the selected context.

In one exemplary embodiment of step 310, the binarization of the number $Ndup_n$ is performed by a series of binary data $g_j$, for j>=0. A binary data gj equals to a particular value PV (for example $g_j=1$) to indicate if $Ndup_n$ is equal to j and does not equal to said specific value PV otherwise (for example gj=0). Then, a first binary $g_0$ is coded. For example, if $g_0=PV$, the coding of $Ndup_n$ is finished as $Ndup_n=1$ has been coded; otherwise, if $g_0 \neq PV$, then a second binary data $g_1$ is coded. If $g_1 \neq PV$, then a third binary data $g_2$ is coded and so on. This is basically a unary coding of $Ndup_n$.

In one exemplary embodiment, the method further comprises, in step 340, obtaining a residual RP as a difference between the number $Ndup_n$, and the maximum bound (upper bound) $NP_{flag}$. Then, if a binary data $g_{NPflag-1}$ is reached and is not equal to PV, then one has necessarily $Ndup_n \geq NP_{flag}$ and the residual RP is given by: $RP = Ndup_n - NP_{flag}$.

In one exemplary embodiment of step 340, the residual RP is encoded by using an exp-Golomb code.

In one exemplary embodiment of step 310, a binary data $g_j$ is a flag and PV=1.

In one exemplary embodiment of step 330, a binary data $g_j$ is entropy coded by a Context-Adaptive Binary Arithmetic Coder (like CABAC).

Figure 13:
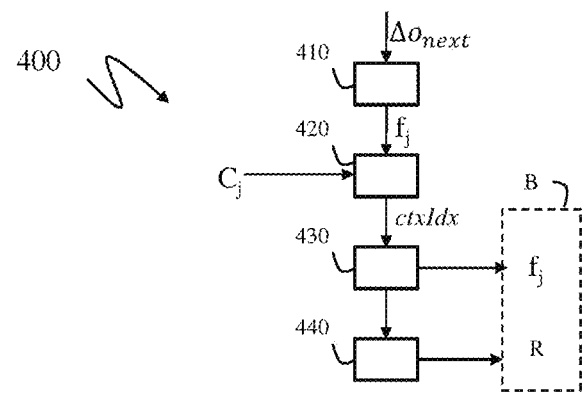
FIG. 13 illustrates a block diagram of steps of a method 400 of entropy-coding an order index difference in accordance with at least one exemplary embodiment of the present disclosure.

FIG. 13 illustrates a block diagram of steps of a method 400 of entropy-coding an order index difference $\Delta o_{next}$ in accordance with at least one exemplary embodiment.

In step 410, at least one binary data $f_j$ is obtained by binarizing the order index difference $\Delta o_{next}$.

For each binary data $f_j$, a context is selected (step 420) based on a distance $C_j$ between an azimuthal angle $\phi^j$ associated with the binary data $f_j$ and an azimuthal angle of an already encoded point, and each binary data $f_j$ is context-adaptive entropy coded (step 430) in the bitstream B, based on the selected context. As will become clear hereafter, similarly to the quantity $\phi_{next}$, the quantity $\phi^j$ is abusively referred as an azimuthal angle even if it is an index between 0 and I−1 that points to a particular discrete angle among the $\phi_i$'s.

Context-adaptive entropy encoding the order index difference provides efficient compression performance compared to other encoding technics such as a predictive tree encoding technique because such prediction-based encoding technics do not catch the intrinsic structure of the representation ($\phi$, $\lambda$) of point locations. Such structure is captured by the exemplary embodiments of the present application by selecting contexts and entropy encoding the order index difference based on the selected context.

In one exemplary embodiment of step 410, the binarization of the order index difference $\Delta o_{next}$ is performed by a series of binary data $f_j$, for j>0. The binary data $f_0$ always equals 0 because the order index difference $\Delta o_{next}$ is strictly positive. The binary data $f_0$ is not encoded.

A binary data fj equals to a particular value PV (for example $f_j=1$) to indicate if $\Delta o_{next}$ is equal to j and does not equal to said specific value PV otherwise (for example fj=0). Then, a first binary $f_1$ is coded. For example, if $f_1=PV$, the coding of $\Delta o_{next}$ is finished as $\Delta o_{next}=1$ has been coded; otherwise, if $f_1 \neq PV$, then a second binary data $f_2$ is coded. If $f_2 \neq PV$, then a third binary data $f_3$ is coded and so on. This is basically a unary coding of $\Delta o_{next}$.

In one exemplary embodiment of step 410, when the points are ordered according to a lexicographic order based first on the azimuthal angle and then on the sensor index (FIG. 7), the azimuthal angle $\phi^j$ associated with a binary data $f_j$ is the azimuthal angle $\phi_n$ associated with the current point $P_n$ if j+c<K where c is the index of the current point modulo K (or equivalently c is the sensor index $\lambda_n$ of the current point $P_n$); otherwise the azimuthal angle $\phi^j$ associated with a binary data $f_j$ is the azimuthal angle $$\phi^j = \phi_{next} + s$$

where s is an integer such that $sK \leq j+c < (s+1)K$. Each binary data $f_j$ is also associated with a sensor index $\lambda^j$ which corresponds to the sensor index of a sensor that would have captured the point $P_{next}$ in case $f_j$ would be equal to PV, i.e. $\lambda^j = \lambda_n + j \mod K$.

On FIG. 7, the order index difference $\Delta o_{next}$ equals 8 and is binarized into eight binary data $f_1$ to $f_8$ all not equal to PV except the last one $f_8$ which equals to PV. Note that f0 always equals 0 because, by definition the order of $P_{next}$ is different from the order of $P_n$. Consequently, $f_0$ does not need to be coded and will be inferred to 0 by the decoder. Azimuthal angles $\phi^1$ to $\phi^6$ respectively associated with binary data $f_1$ to $f_6$ are equal to the azimuthal angle $\phi_n$ and azimuthal angles $\phi^7$ and $\phi^8$ respectively associated with $f_7$ and $f_8$ are equal to $\phi_{next}$.

In one exemplary embodiment of step 410, when the points are ordered according to a lexicographic order based first on the sensor index and then on the azimuthal angle (FIG. 8), the azimuthal angles $\phi^j$ associated with a binary data $f_j$ is given by:

$$\phi^j = \phi_n + j$$

Each binary data $f_j$ is also associated with a sensor index $\lambda^j$ which corresponds to the sensor index of a sensor that would have captured the point $P_{next}$ in case $f_j$ would be equal to PV, i.e. $\lambda^j = \lambda_n$.

On FIG. 8, the order index difference $\Delta o_{next}$ equals 4 and is binarized into five binary data $f_1$ to $f_4$ all not equal to PV except the last one $f_4$ which equals to PV. Azimuthal angles $\phi^1$ to $\phi^4$ respectively associated with binary data $f_1$ to $f_4$ are respectively $\phi_n+1$, $\phi_n+2$, $\phi_n+3$ and $\phi_n+4=\phi_{next}$.

In one exemplary embodiment, the method further comprises, in step 440, obtaining a residual R as a difference between the order index difference $\Delta o_{next}$ and a maximum bound (upper bound) $N_{flag}$. Then, if a binary data $f_{Nflag-1}$ is reached and is not equal to PV, then one has necessarily $\Delta o_{next} \geq N_{flag}$ and the residual R is given by: $R = \Delta o_{next} - N_{flag}$.

The maximum number of flags $N_{flag}$ is set to bound the number of arithmetically coded binary information per point and then bound the latency to obtain a next point.

In one exemplary embodiment of step 440, the residual R is encoded by using an exp-Golomb code.

In one exemplary embodiment of step 410, a binary data $f_j$ is a flag and PV=1.

In one exemplary embodiment of step 430, a binary data $f_j$ is entropy coded by a Context-Adaptive Binary Arithmetic Coder (like CABAC).

Figure 14:
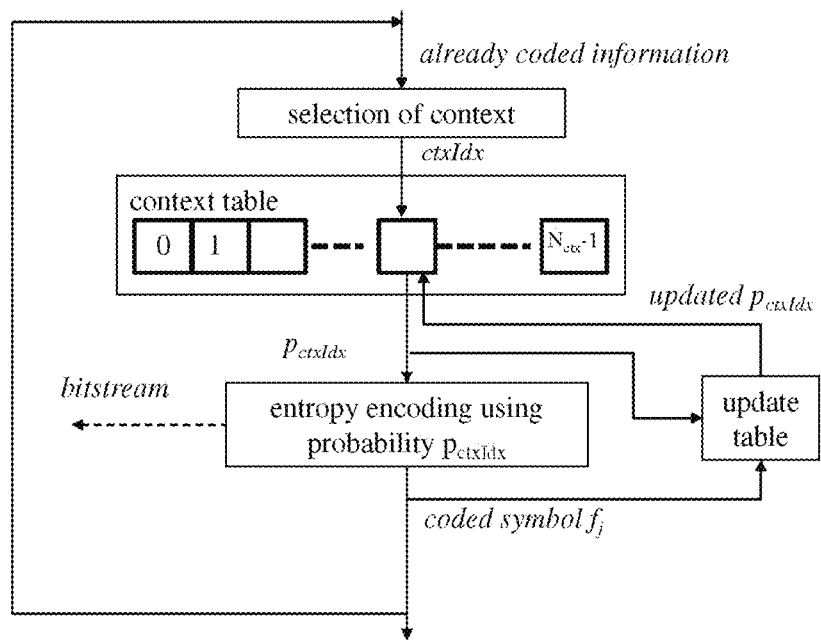
FIG. 14 illustrates a block diagram of a context-adaptive arithmetic encoders in accordance with at least one exemplary embodiment of the present disclosure.

FIG. 14 illustrates schematically a block diagram of a Context-Adaptive Binary Arithmetic encoder.

Firstly, a context is selected by some selection process based on already coded information to provide a context index ctxIdx associated with each binary symbol $f_j$ (or gj). A context table with $N_{ctx}$ entries stores the probabilities associated with the contexts and the probability $p_{ctxIdx}$ is obtained as the ctxIdx-th entry of the context table. A binary symbol $f_j$ is encoded in the bitstream by an entropy coder using the probability $p_{ctxIdx}$.

Entropy coders are usually arithmetic coders but may be any other type of entropy coders like asymmetric numeral systems. In any case, optimal coders adds $-\log 2(p_{ctxIdx})$ bits in the bitstream to encode $f_j=1$ or $-\log 2(1-p_{ctxIdx})$ bits in the bitstream to encode $f_j=0$. Once the symbol $f_j$ is encoded, the probability $p_{ctxIdx}$ is updated by using an update process taking $f_j$ and $p_{ctxIdx}$ as entries; the update process is usually performed by using update tables. The updated probability replaces the ctxIdx-th entry of the context table. Then, another symbol can be encoded, and so on. The update loop back to the context table is a bottleneck in the coding workflow as another symbol can be encoded only after the update has been performed. For this reason, the memory access to the context table must be as quick as possible and minimizing the size of the context table helps easing its hardware implementation.

A Context-Adaptive Binary Arithmetic decoder performs essentially the same operations the Context-Adaptive Binary Arithmetic encoder except that the coded symbol $f_j$ is decoded from the bitstream by an entropy decoder using the probability $p_{ctxIdx}$.

The choice of the adequate context, i.e. the probability $p_{ctxIdx}$ that estimates at best the chance of the binary data $f_j$ to be equals to PV, is essential to obtain good compression. Therefore, the context selection should use relevant already coded information and correlation to obtain this adequate context.

In one exemplary embodiment of step 420, the distance $C_j$ associated with a binary data $f_j$ depends on an azimuthal angle $\phi^j$ associated with the binary data $f_j$ and an (index of an) azimuthal angle $\phi_{penult}$ associated with a penultimate already coded point $P_{penult}$ with a same sensor index as the sensor index $\lambda^j$ associated with the binary data $f_j$. The current point $P_n$ is never considered in the set of already coded points from which the penultimate already coded point $P_{penult}$ is determined.

In one exemplary embodiment of step 420, the distance $C_j$ associated with a binary data $f_j$ is given by:

$$C_j = \phi^j - \phi_{penult,j} \quad (4)$$

It is reminded that the two quantities $\phi^j$ and $\phi_{penult,j}$ are indices pointing to discrete angles in the set of discrete number of values $\phi_i$ (i=0 to I-1).

On FIG. 7, the distance $C_1=4$ because the difference between, on one hand, the azimuthal angles $\phi_{penult,3}$, associated with the penultimate already coded point (grey circle) with the sensor index $\lambda^1 = \lambda_n + 1 = 3$ associated with $f_1$, and, on the other hand, $\phi^1 = \phi_n$ equals 4. Then, $C_2=3$ because the difference between the azimuthal angles $\phi_{penult,4}$ associated with the penultimate already coded point with the sensor index $\lambda^2 = \lambda_n + 2 = 4$ associated with $f_2$, and $\phi^2 = \phi_n$ equals 3, and so on. Further, $C_7=3$ because the difference between the azimuthal angles $\phi_{penult,0}$ associated with the penultimate already coded point with the sensor index $\lambda^7 = \lambda_n + 7 = 9 = 0$ mod K (here K=9) associated with $f_7$ and $\phi^7 = \phi_n + 1$ equals 3. Finally, $C_8=2$ because the difference between the azimuthal angles $\phi_{penult,1}$ associated with the penultimate already coded point with the sensor index $\lambda^8 = \lambda_n + 8 = 10 = 1$ mod K associated with $f_8$ and $\phi^8 = \phi_{next}$ equals 2.

On FIG. 8, all binary data $f_j$ are associated with the same sensor index $\lambda^j = \lambda_n$. The distance $C_0=2$ because the difference between the azimuthal angle $\phi_{penult,\lambda_n}$ associated with the penultimate already coded point (grey circle) and $\phi^0 = \phi_n$ equals 2. The distance $C_1=3$ because the difference between the azimuthal angles $\phi_{penult,\lambda_n}$ associated with the penultimate already coded point and $\phi^1 = \phi_n + 1$ equals 3, and so on.

In one exemplary embodiment of step 420, the distance $C_j$ associated with a binary data $f_j$ depends on an azimuthal angle $\phi^j$ associated with the binary data $f_j$ and an (index of an) azimuthal angle $\phi_{al}$ associated with any of the already coded points not necessarily probed by the same sensor index as the sensor index of a current point $P_n$.

In one exemplary embodiment of step 420, the distance $C_j$ associated with a binary data $f_j$ is given by:

$$C_j = \phi^j - \phi_{al}$$

In one exemplary embodiment of step 420, a context index ctxIdx of a context table associated with a binary data $f_j$ equals to the distance $C_j$.

In one exemplary embodiment of step 420, a context index ctxIdx is capped by a threshold th1 to limit the number of contexts:

$$\text{ctxIdx} = \min(C_j, th1)$$

For example, th1 may be equal to 6.

Limiting the number of contexts is important in order to ease implementation, limit memory use and also to ensure statistical relevance of the probabilities $p_{ctxIdx}$ as high values of j may not be often visited.

In one exemplary embodiment of step 420, a context index ctxIdx for a binary data $f_j$ depends on the rank j of said binary data in a series of binary data representing the order index difference $\Delta o_{next}$.

Because the statistics of the binary data $f_j$ tend to become weakly dependent on the rank j for high j, one may take advantage of this weak dependence to limit the number of contexts.

Moreover, dependency between the context index ctxIdx and the value j provides advantages for the following reasons: the statistics of each binary flag $f_j$ being equal to PV or not depend on the index j. Typically the probability $P(f_j=PV|f_0$ to $f_{j-1} \neq PV)$ decreases with j. Therefore, one obtains better probabilities $p_{ctxIdx}$ by making the index ctxIdx depends on j In one exemplary embodiment of step 420, a context index ctxIdx is given by:

$$ctxIdx=\min(C_j,th1)*(th2+1)+\min(j,th2)$$

where $th_2$ is a second threshold such as to have $(th1+1)*(th_2+1)$ contexts. For example, one may take th2 equal to 3.

In one exemplary embodiment of step 420, the context index ctxIdx depends on the sensor index λj associated with the binary data $f_j$.

The statistics of each binary data $f_j$ being equal or not to PV also depends on the sensor index probing the location of where the next point would be, should the binary data $f_j$ equals to PV. For example, sensors directed to the ground almost always probe something (mostly the road), but sensors directed to the sky tend to probe more object less often, like buildings or trees. But dependency between the context index ctxIdx and the sensor index $\lambda^j$ associated with the binary data $f_j$ multiplies the number of contexts by K (the number of sensors) and likely provides a very high number of contexts as typical Lidar head have 16, 32 or even 64 laser beams.

In one exemplary embodiment of step 420, the sensors with close elevation angles are regrouped together into packs, because all sensors of the same pack tend to probe similar objects.

Each sensor whose index is λ has a corresponding pack index $\lambda_{pack}(\lambda)$, and the binary data $f_j$ associated the sensor index $\lambda^j$ has an associated pack index with pack index $\lambda_{j,pack}$.

Grouping the sensors into packs limits the number of contexts.

In one exemplary embodiment of step 420, the context index ctxIdx is given by:

$$ctxIdx=(\min(C_j,th)*(th_2+1)+\min(j,th_2))*N_{pack}+\lambda_{j,pack}$$

where $N_{pack}$ is a number of packs.
The number of contexts becomes $(th+1)*(th_2+1)*N_{pack}$.
In a variant, a pack index $\lambda_{j,pack}$ is given by:

$$\lambda_{j,pack}=\text{floor}(\lambda^j*N_{pack}/K)$$

such that $\lambda_{j,pack}$ belongs to $[0, N_{pack}-1]$.

The number of contexts may then be tuned by setting adequate values to th1 and/or $th_2$ and/or $N_{pack}$. These values may be coded in the bitstream B. For example, with respective values 6, 3 and 4, one gets 7*4*4=112 which is an acceptable number of contexts.

Figure 15:
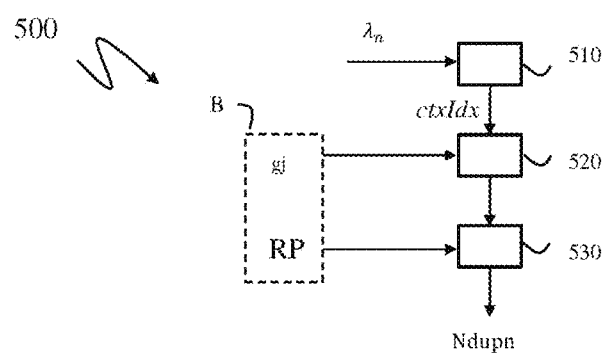
FIG. 15 shows a block diagram of steps of a method 500 of entropy-decoding a number of duplicated points in accordance with at least one exemplary embodiment of the present disclosure.

FIG. 15 shows a block diagram of steps of a method 500 of entropy-decoding a number of duplicated points $Ndup_n$ in accordance with at least one exemplary embodiment.

Decoding, from the bitstream B, a number $Ndup_n$ of duplicated points associated with a decoded current point $P_n$ comprises decoding a series of binary data $g_j$ from the bitstream B. The series of binary data comprises a number of bits lower than or equal to a maximum bound (upper bound) $NP_{flag}$. For each binary data $g_j$, in step 510, the method selects a context based on based on the index j and the sensor index $\lambda_n$ associated with the current point $P_n$. The method then context-based entropy decodes (step 520) said at least one binary data $g_j$ based on the selected contexts and probability information relative to the binary data $g_j$ and decoded from the bitstream B. Next, the number $Ndup_n$ of duplicated points is obtained (step 530) from the context-based entropy decoded binary data $g_j$.

In one exemplary embodiment, in step 530, if a binary data $g_{NPflag-1}$ is reached and is not equal to PV, then a residual RP is also decoded from the bitstream B and the number $Ndup_n$ of duplicated points is obtained by $Ndup_n=RP+NP_{flag}$.

In one exemplary embodiment of step 530, the residual RP is decoded by using an exp-Golomb code.

Context selection of steps 320 and 510 are the same. Therefore, all exemplary embodiments and variants of step 320 apply to step 510.

In one exemplary embodiment of step 520, a binary data $g_j$ is entropy decoded by a Context-Adaptive Binary Arithmetic decoder (like CABAC). Context-based entropy decoding (step 520) a binary data $g_j$ based on a selected context is essentially the same as the Context-based entropy encoding on FIG. 14.

Basically, entropy decoders decode $-\log 2(p_{ctxIdx})$ bits from the bitstream B to decode a binary value $g_j=1$ or $-\log 2(1-p_{ctxIdx})$ bits from the bitstream B to decode $g_j=0$. Once the symbol $f_j$ is decoded, the probability $p_{ctxIdx}$ is updated by using an update process taking $g_j$ and $p_{ctxIdx}$ as entries; the update process is usually performed by using update tables. The updated probability replaces the ctxIdx-th entry of the context table. Then, another symbol can be decoded, and so on. The update loop back to the context table is a bottleneck in the coding workflow as another symbol can be decoded only after the update has been performed. For this reason, the memory access to the context table must be as quick as possible and minimizing the size of the context table helps easing its hardware implementation.

In one exemplary embodiment of step 530, the number of duplicated points $Ndup_n$ is decoded by a unary decoding of the at least one decoded binary data $g_j$.

For example, if a first $g_0=PV$, the decoding is finished as $Ndup_n=0$ has been decoded; otherwise, if $g_0 \neq PV$, then a second binary data $g_1$ is decoded otherwise $Ndup_n=1$ and the decoding is finished. If $g_1 \neq PV$, then a third binary data $g_2$ is decoded and so on.

Figure 16:
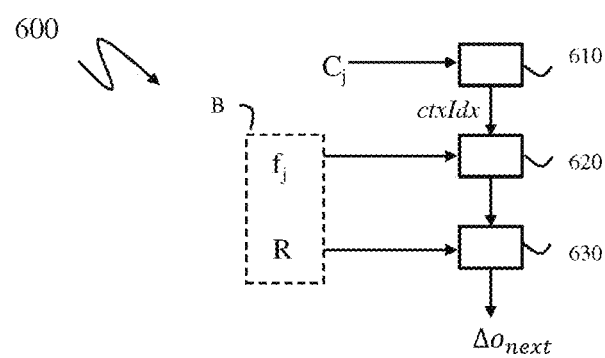
FIG. 16 shows a block diagram of steps of a method 600 of entropy-decoding an order index difference in accordance with at least one exemplary embodiment of the present disclosure.

FIG. 16 shows a block diagram of steps of a method 600 of entropy-decoding an order index difference $\Delta o_{next}$ in accordance with at least one exemplary embodiment.

Decoding, from the bitstream B, a point $P_{next}$ of a point cloud comprises decoding, from the bitstream B, an order index difference $\Delta o_{next}$ representing a difference between an order index $o(P_{next})$ associated with the point $P_{next}$ and another order index $o(P_n)$ associated with a current point $P_n$.

Decoding an order index difference $\Delta o_{next}$ comprises decoding at least one binary data $f_j$ from the bitstream B. For each binary data $f_j$, the method selects (step 610) a context based on a distance $C_j$ between a azimuthal angle $\phi^j$ associated with the binary data $f_j$ and an azimuthal angle ($\phi_{penult}$ or $\phi_{al}$) of an already decoded point. The method then context-based entropy decodes (step 620) said at least one binary data $f_j$ based on the selected contexts and probability information relative to the binary data $f_j$ and decoded from the bitstream B. Next, the order index difference $\Delta o_{next}$ is obtained (step 630) from the context-based entropy decoded binary data $f_j$.

In one exemplary embodiment, the method further comprises, in step 630, if a binary data $f_{Nflag-1}$ reached and is not equal to PV, then a residual R is also decoded from the bitstream B and the order index difference $\Delta o_{next}$ is obtained by $\Delta o_{next} = R + N_{flag}$.

In one exemplary embodiment of step 630, the residual R is decoded by using an exp-Golomb code.

Context selection of steps 420 and 610 are the same. Therefore, all exemplary embodiments and variants of step 420 apply to step 610.

In one exemplary embodiment of step 620, a binary data $f_j$ is entropy decoded by a Context-Adaptive Binary Arithmetic decoder (like CABAC). Context-based entropy decoding (step 620) a binary data $f_j$ based on a selected context is essentially the same as the Context-based entropy encoding on FIG. 14.

Basically, entropy decoders decode $-\log 2(p_{ctxIdx})$ bits from the bitstream B to decode a binary value $f_j=1$ or $-\log 2(1-p_{ctxIdx})$ bits from the bitstream B to decode $f_j=0$. Once the symbol $f_j$ is decoded, the probability $p_{ctxIdx}$ is updated by using an update process taking $f_j$ and $p_{ctxIdx}$ as entries; the update process is usually performed by using update tables. The updated probability replaces the ctxIdx-th entry of the context table. Then, another symbol can be decoded, and so on. The update loop back to the context table is a bottleneck in the coding workflow as another symbol can be decoded only after the update has been performed. For this reason, the memory access to the context table must be as quick as possible and minimizing the size of the context table helps easing its hardware implementation.

In one exemplary embodiment of step 630, the order index difference $\Delta o_{next}$ is decoded by a unary decoding of the at least one decoded binary data $f_j$.

For example, if a first $f_1=PV$, the decoding is finished as $\Delta o_{next}=0$ has been decoded; otherwise, if $f_1 \neq PV$, then a second binary data $f_2$ is decoded otherwise $\Delta o_{next}=1$ and the decoding is finished. If $f_2 \neq PV$, then a third binary data $f_3$ is decoded and so on.

Figure 17:
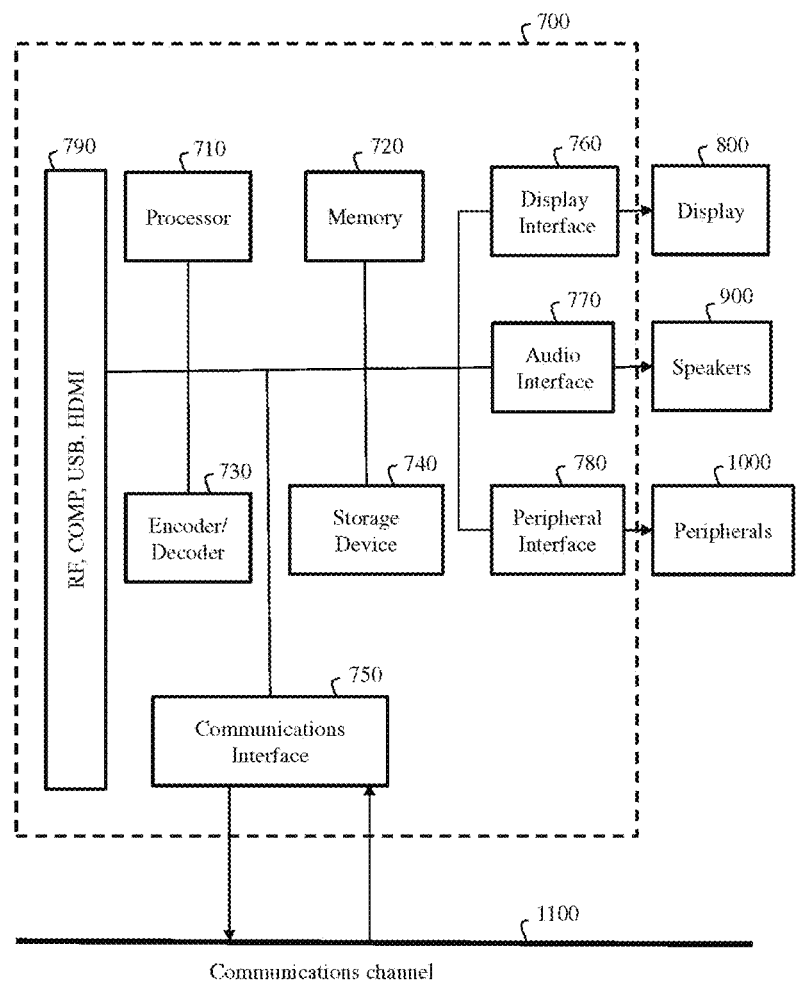
FIG. 17 illustrates a schematic block diagram of an example of a system in which various aspects and exemplary embodiments are implemented in accordance with at least one exemplary embodiment of the present disclosure.

FIG. 17 shows a schematic block diagram illustrating an example of a system in which various aspects and exemplary embodiments are implemented.

System 700 may be embedded as one or more devices including the various components described below. In various embodiments, the system 700 may be configured to implement one or more of the aspects described in the present application.

Examples of equipment that may form all or part of the system 700 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 700, singly or in combination, may be embodied in a single integrated circuit (IC), multiple ICs, and/or discrete components. For example, in at least one embodiment, the processing and encoder/decoder elements of system 700 may be distributed across multiple ICs and/or discrete components. In various embodiments, the system 700 may be communicatively coupled to other similar systems, or to other electronic devices, via, for example, a communications bus or through dedicated input and/or output ports.

The system 700 may include at least one processor 710 configured to execute instructions loaded therein for implementing, for example, the various aspects described in the present application. Processor 710 may include embedded memory, input output interface, and various other circuitries as known in the art. The system 700 may include at least one memory 720 (for example a volatile memory device and/or a non-volatile memory device). System 700 may include a storage device 740, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 740 may include an internal storage device, an attached storage device, and/or a network accessible storage device, as non-limiting examples.

The system 700 may include an encoder/decoder module 730 configured, for example, to process data to provide encoded/decoded point cloud geometry data, and the encoder/decoder module 730 may include its own processor and memory. The encoder/decoder module 730 may represent module(s) that may be included in a device to perform the encoding and/or decoding functions. As is known, a device may include one or both of the encoding and decoding modules. Additionally, encoder/decoder module 730 may be implemented as a separate element of system 700 or may be incorporated within processor 710 as a combination of hardware and software.

Program code to be loaded onto processor 710 or encoder/decoder 730 to perform the various aspects described in the present application may be stored in storage device 740 and subsequently loaded onto memory 720 for execution by processor 710. In accordance with various embodiments, one or more of processor 710, memory 720, storage device 740, and encoder/decoder module 730 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 710 and/or the encoder/decoder module 730 may be used to store instructions and to provide working memory for processing that may be performed during encoding or decoding.

In other embodiments, however, a memory external to the processing device (for example, the processing device may be either the processor 710 or the encoder/decoder module 730) may be used for one or more of these functions. The external memory may be the memory 720 and/or the storage device 740, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 700 may be provided through various input devices as indicated in block 790. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 790 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 700 to other electronic devices across USB and/or HDMI connections. In some embodiments, various aspects of input processing, for example, Reed-Solomon error correction, may be implemented, for example, within a separate input processing IC or within processor 710 as necessary. Similarly, aspects of USB or HDMI interface processing may be implemented within separate interface ICs or within processor 710 as necessary. The demodulated, error corrected, and demultiplexed stream may be provided to various processing elements, including, for example, processor 710, and encoder/decoder 730 operating in combination with the memory and storage elements to process the data stream as necessary for presentation on an output device.

Various elements of system 700 may be provided within an integrated housing. Within the integrated housing, the various elements may be interconnected and transmit data therebetween using suitable connection arrangement 790, for example, an internal bus as known in the art, including the I2C bus, wiring, and printed circuit boards.

The system 700 may include communication interface 750 that enables communication with other devices via communication channel 1100. The communication interface 750 may include, but is not limited to, a transceiver configured to transmit and to receive data over communication channel 1100. The communication interface 750 may include, but is not limited to, a modem or network card and the communication channel 1100 may be implemented, for example, within a wired and/or a wireless medium.

Data may be streamed to the system 700, in various embodiments, using a Wi-Fi network such as IEEE 802.11. The Wi-Fi signal of these embodiments may be received over the communications channel 1100 and the communications interface 750 which are adapted for Wi-Fi communications. The communications channel 1100 of these embodiments may be typically connected to an access point or router that provides access to outside networks including the Internet for allowing streaming applications and other over-the-top communications.

Other embodiments may provide streamed data to the system 700 using a set-top box that delivers the data over the HDMI connection of the input block 790.

Still other embodiments may provide streamed data to the system 700 using the RF connection of the input block 790.

The streamed data may be used as a way for signaling information used by the system 700. The signaling information may comprise the bitstream B and/or information such a number of points of a point cloud, coordinates or order o($P_1$) of a first point in the angular coordinates ($\phi$, $\lambda$) system, a number $Ndup_n$ of duplicated points, a binary information $BP_n$, a order index difference and/or sensor setup parameters such as such as an elementary azimuthal shift $\Delta\phi$ or an elevation angle $\theta_k$ associated with a sensor of the Lidar head 10.

It is to be appreciated that signaling may be accomplished in a variety of ways. For example, one or more syntax elements, flags, and so forth may be used to signal information to a corresponding decoder in various embodiments.

The system 700 may provide an output signal to various output devices, including a display 800, speakers 900, and other peripheral devices 1000. The other peripheral devices 1000 may include, in various examples of embodiments, one or more of a stand-alone DVR, a disk player, a stereo system, a lighting system, and other devices that provide a function based on the output of the system 700.

In various embodiments, control signals may be communicated between the system 700 and the display 800, speakers 900, or other peripheral devices 1000 using signaling such as AV.Link (Audio/Video Link), CEC (Consumer Electronics Control), or other communications protocols that enable device-to-device control with or without user intervention.

The output devices may be communicatively coupled to system 700 via dedicated connections through respective interfaces 760, 770, and 780.

Alternatively, the output devices may be connected to system 700 using the communications channel 1100 via the communications interface 750. The display 800 and speakers 900 may be integrated in a single unit with the other components of system 700 in an electronic device such as, for example, a television.

In various embodiments, the display interface 760 may include a display driver, such as, for example, a timing controller (T Con) chip.

The display 800 and speaker 900 may alternatively be separate from one or more of the other components, for example, if the RF portion of input 790 is part of a separate set-top box. In various embodiments in which the display 800 and speakers 900 may be external components, the output signal may be provided via dedicated output connections, including, for example, HDMI ports, USB ports, or COMP outputs.

In FIG. 1-17, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 710 or by hardware, or by a combination of hardware and software. As a non-limiting example, the embodiments may be also implemented by one or more integrated circuits. The memory 720 may be of any type appropriate to the technical environment and may be implemented using any appropriate data storage technology, such as optical memory devices, magnetic memory devices, semiconductor-based memory devices, fixed memory, and removable memory, as non-limiting examples. The processor 710 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. The terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

Although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it also provides a block diagram of a corresponding apparatus. Similarly, when a figure is presented as a block diagram, it also provides a flow diagram of a corresponding method/process.

Although some of the diagrams include arrows on communication paths to show a primary direction of communication, communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or alternatively, include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process is clear based on the context of the specific descriptions.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process is clear based on the context of the specific descriptions.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or order $o(P_1)$ of a first point in the 2D coordinates $(\phi, \lambda)$ system, a number of duplicated points, an order index difference or sensor setup parameters such as the elementary azimuthal shift $\Delta\phi$ or an elevation angle $\theta_k$ associated with a sensor k. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, various modifications may be made. For example, elements of different implementations may be combined, supplemented, modified, or removed to produce other implementations. Additionally, other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

What is claimed is:

1. A method of encoding a point cloud captured by a set of sensors into a bitstream of encoded point cloud data, comprising:
    obtaining, by an encoder for a point of the point cloud, a sensor index ($\lambda_n$) associated with a sensor that captured the point, an azimuthal angle ($\phi_n$) representing a capture angle of the sensor, each captured point being represented by a point in a 2D discrete angular plane in which the sensor index ($\lambda_n$) is a coordinate of a first axis of the 2D discrete angular plane and the azimuthal angle ($\phi_n$) is a coordinate of a second axis of the 2D discrete angular plane;
    ordering, by the encoder, points of the point cloud according to a lexicographic order based first on azimuthal angles ($\phi_n$) of the points and then on sensor indices ($\lambda_n$) of the points or inversely, to obtain a list of ordered points of the point cloud, an order index being associated with each point of the point cloud according to a rank of the each point in the list of ordered points;
    obtaining, by the encoder, a next point ($P_{next}$) following a current point ($P_n$) in the list of ordered points, and having an order index ($o(P_{next})$) different of an order index ($o(P_n)$) of the current point ($P_n$), and obtaining, by the encoder, a number ($Ndup_n$) of duplicated points equals to a number of points following the current point ($P_n$) that have an order index equals to the order index ($o(P_n)$) of the current point ($P_n$);
    encoding, by the encoder in the bitstream, the number ($Ndup_n$) of duplicated points;
    obtaining and encoding, by the encoder in the bitstream, an order index difference ($\Delta o_{next}$) representing a difference between the order index ($o(P_{next})$) of the next point ($P_{next}$) and the order index ($o(P_n)$) of the current point ($P_n$); and
    updating, by the encoder, the current point ($P_n$) to a new current point ($P_n$) by taking the next point ($P_{next}$) as being the new current point ($P_n$).

2. The method of claim 1, wherein encoding the number ($Ndup_n$) of duplicated points comprises:
    binarizing the number ($Ndup_n$) of duplicated points into a series of binary data, a number of the series of binary data being lower than or equal to a maximum bound; and
    entropy coding each binary data of the series of binary data.

3. The method of claim 2, wherein each binary data is context-adaptive arithmetic coded such that a context used to code a binary data depends on a sensor index associated with the current point.

4. The method of claim 2, wherein encoding the number ($Ndup_n$) of duplicated points further comprises encoding a residual obtained as a difference between the number ($Ndup_n$) of duplicated points and the maximum bound.

5. The method of claim 4, wherein encoding the residual comprises:
    encoding the residual by using an expGolomb code.

6. The method of claim 1, further comprising:
    encoding, by the encoder in the bitstream, a binary information ($BP_n$) indicating whether duplicated points of the current point ($P_n$) have or not same three-dimensional coordinates.

7. A method of decoding a point cloud captured by a set of sensors from a bitstream of encoded point cloud data, comprising:
    decoding, by a decoder from the bitstream, an information representative of a number ($Ndup_n$) of duplicated points associated with an already decoded current point ($P_n$) of the point cloud;
    reconstructing, by the decoder, a number of duplicated points, which equals to the decoded number ($Ndup_n$) of duplicated points, each duplicated point having a same azimuthal angle equaling to an azimuthal angle of the already decoded current point ($P_n$), and a sensor index equaling to a sensor index of the already decoded current point ($P_n$), wherein the azimuthal angle represents a capture angle of a sensor that captured the already decoded current point ($P_n$), and the sensor index is associated with the sensor;
    decoding, by the decoder, an order index difference ($\Delta o_{next}$) from the bitstream for a next point ($P_{next}$), the next point ($P_{next}$) having an order index ($o(P_{next})$) different of an order index ($o(P_n)$) of the already decoded current point ($P_n$), an order index being associated with a point of the point cloud according to a rank of the point in a list of ordered points obtained by ordering points of the point cloud according to a lexicographic order based first on azimuthal angles and then on sensor indices associated with the points of the point cloud, or inversely;

obtaining, by the decoder, an order index ($o(P_{next})$) for the next point ($P_{next}$) from the decoded order index difference ($\Delta o_{next}$) and the order index ($o(P_n)$) of the already decoded current point ($P_n$);

obtaining, by the decoder, a sensor index ($\lambda_{next}$) associated with a sensor that captured the next point ($P_{next}$) and an azimuthal angle ($\phi_{next}$) representing a capture angle of the sensor from the order index ($o(P_{next})$) of the next point ($P_{next}$); and updating, by the decoder, the already decoded current ($P_n$) to a new already decoded current point by taking the next point ($P_{next}$) as being the new already decoded current point.

8. The method of claim 7, wherein decoding the number ($Ndup_n$) of duplicated points comprises:

entropy decoding each binary data of a series of binary data, a number of the series of binary data being lower than or equal to a maximum bound; and obtaining the number ($Ndup_n$) of duplicated points by a unary decoding of at least one decoded binary data of the series of binary data.

9. The method of claim 8, wherein each binary data is context-adaptive arithmetic decoded such that a context used to decode a binary data depends on a sensor index associated with the already decoded current point.

10. The method of claim 8, wherein decoding the number ($Ndup_n$) of duplicated points further comprises decoding a residual obtained as a difference between the number ($Ndup_n$) of duplicated points and the maximum bound.

11. The method of claim 10, wherein decoding the residual comprises:

decoding the residual by using an expGolomb code.

12. The method of claim 7, wherein the method further comprises decoding, from the bitstream, a binary information ($BP_n$) indicating whether duplicated points of the already decoded current point ($P_n$) have or not same three-dimensional coordinates.

13. An apparatus of encoding a point cloud captured by a set of sensors into a bitstream of encoded point cloud data, comprising one or more processors configured to:

obtain, for a point of the point cloud, a sensor index ($\lambda_n$) associated with a sensor that captured the point, an azimuthal angle ($\phi_n$) representing a capture angle of the sensor, each captured point being represented by a point in a 2D discrete angular plane in which the sensor index ($\lambda_n$) is a coordinate of a first axis of the 2D discrete angular plane and the azimuthal angle ($\phi_n$) is a coordinate of a second axis of the 2D discrete angular plane;

order points of the point cloud according to a lexicographic order based first on azimuthal angles ($\phi_n$) of the points and then on sensor indices ($\lambda_n$) of the points or inversely, to obtain a list of ordered points of the point cloud, an order index being associated with each point of the point cloud according to a rank of the each point in the list of ordered points;

obtain a next point ($P_{next}$) following a current point ($P_n$) in the list of ordered points, and having an order index ($o(P_{next})$) different of an order index ($o(P_n)$) of the current point ($P_n$), and obtaining a number ($Ndup_n$) of duplicated points equals to a number of points following the current point ($P_n$) that have an order index equals to the order index ($o(P_n)$) of the current point ($P_n$);

encode, in the bitstream, the number ($Ndup_n$) of duplicated points; and obtain and encode, in the bitstream, an order index difference ($\Delta o_{next}$) representing a difference between the order index ($o(P_{next})$) of the next point ($P_{next}$) and the order index ($o(P_n)$) of the current point ($P_n$).

* * * * *